US006481512B1

(12) United States Patent
Nagatsuka (10) Patent No.: US 6,481,512 B1
(45) Date of Patent: Nov. 19, 2002

(54) JOINT DEVICE FOR ROBOT DEVICE AND LEG- WALKING ROBOT DEVICE

(75) Inventor: Masaki Nagatsuka, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/647,127

(22) PCT Filed: Jan. 28, 2000

(86) PCT No.: PCT/JP00/00493

§ 371 (c)(1),
(2), (4) Date: Nov. 20, 2000

(87) PCT Pub. No.: WO00/44536

PCT Pub. Date: Aug. 3, 2000

(30) Foreign Application Priority Data

Jan. 28, 1999 (JP) .......................... 11-020186

(51) Int. Cl.$^7$ .............................. B62D 51/06
(52) U.S. Cl. .......................... 180/8.1; 464/42
(58) Field of Search ................. 180/8.1, 8.5, 8.6; 464/42

(56) References Cited

U.S. PATENT DOCUMENTS

| 4,166,338 A | * | 9/1979 | Asano ....................... 46/253 |
| 4,387,604 A | * | 6/1983 | Maher ....................... 74/354 |
| 4,680,022 A | * | 7/1987 | Hoshino et al. ............ 446/487 |
| 4,717,364 A | * | 1/1988 | Furukawa ................... 446/175 |
| 4,768,991 A | * | 9/1988 | Kopp ........................ 464/36 |
| 4,846,011 A | * | 7/1989 | Gaffney ..................... 74/424.8 |
| 5,040,626 A | * | 8/1991 | Paynter ...................... 180/8.1 |
| 5,157,316 A | * | 10/1992 | Glovier .................... 318/568.11 |
| 5,158,492 A | * | 10/1992 | Ruddell et al. ............ 446/175 |
| 5,355,743 A | * | 10/1994 | Tesar ...................... 74/479 BP |
| 5,405,142 A | * | 4/1995 | Arad et al. ............. 273/118 R |
| 5,484,031 A | * | 1/1996 | Koyachi et al. ............ 180/8.1 |
| 6,149,491 A | * | 11/2000 | Arad et al. ................. 446/35 |

FOREIGN PATENT DOCUMENTS

| JP | 03199993 A | * | 8/1991 | ........... G04B/13/02 |
| JP | 10-197925 | | 7/1998 | |
| JP | 10-249755 | | 9/1998 | |

* cited by examiner

Primary Examiner—Kevin Hurley
Assistant Examiner—Paul Royal, Jr.
(74) Attorney, Agent, or Firm—Frommer Lawrence & Haug LLP; William S. Frommer; Matthew K. Ryan (57) ABSTRACT

If an external force is applied to any one of the legs of a walking robot, or if the output-end gear provided in the leg stops rotating, the motor and gears for driving the leg are prevented from breaking. More specifically, the thigh section 3 of the leg comprises a slip gear 12 arranged in a column of gears. The slip gear 12 slips in the direction opposite to the direction the slip gear is rotated with a force transmitted between an electric motor 11, i.e., drive means, and the thigh section 3, when this force becomes equal to or greater than a predetermined value.

13 Claims, 6 Drawing Sheets

JOINT DEVICE FOR ROBOT DEVICE AND LEG-WALKING ROBOT DEVICE

This application is a continuation of International Application No. PCT/JP00/00493 filed Jan. 28, 2000.

BACKGROUND OF THE INVENTION

The present invention relates to a joint device for driving the moving sections of a robot apparatus by way of joints and to a walk mechanism having drive means for driving the legs of a robot apparatus. The invention also relates to a drive apparatus having drive means for driving the arms of a robot apparatus, a walking robot apparatus comprising a plurality of legs to be driven by drive means, and a drive force transmitting apparatus for transmitting a drive force from drive means.

Robots shaped like a man and having two legs each and robots shaped like animals and having four legs each have been developed in recent years. Of these walking robots, some are used as industrial robots and the others are used as amusement robots. The industrial walking robots can work in dangerous places to which man cannot walk into. The amusement walking robots can behave like living pets.

The legs of a walking robot are driven by, for example, DC motors. The driving forces are transmitted to the legs via a plurality of gears. The so-called gearbox that contains the DC motors and the gears can drive the legs. The gears are made large and their material is made strong, thereby increasing the strength of the gears. The gears are thereby prevented from being broken due to external shocks they receive.

Any robot that moves while standing is in danger of falling from a high level. The shock the robot receives when it falls onto a lower level may break the gears provided in it.

In the case of a small robot whose leg joints can be easily moved with external forces, an external force may break the drive mechanism provided in the robot. For example, when the joints are forcibly moved with an external force, this force may be transmitted to the drive mechanism, breaking the same. The gearbox incorporated in the robot may contain a shock-absorbing device. If the gearbox incorporates a shock absorber, it will become larger. Any gearbox for driving the joints of a robot should be small and light. If the shock absorber is provided in a gear, the gear will become larger, ultimately increasing the size of the gearbox. Even if the shock absorber is provided outside a gear, the gearbox will become larger.

If the output gear of the gearbox fails to rotate, the motor will stop. In this case, the electric current keeps flowing to one pole only, inevitably generating heat. The heat, thus generated, may damage the drive mechanism.

The problem mentioned above can arise not only at the joints of a robot, but also at any moving section of a robot that is driven by a motor.

BRIEF SUMMARY OF THE INVENTION

The present invention has been made in consideration of the foregoing. An object of the invention is to provide a joint device, a walk mechanism and an arm mechanism, each for use in a robot apparatus and capable of preventing drive means and gears from breaking even if an external force acts on the moving section to which a drive force is transmitted from the drive means such as a motor. Another object of the invention is to provide a walking robot and a drive force transmitting apparatus, each capable of preventing drive means and gears from breaking in such an event.

More specifically, a joint device for use in a robot apparatus, according to this invention, has a first component and a second component that are rotatable around an axle. The device comprises: drive means for transmitting a force through a column of gears; and a slip gear arranged in the column of gears and designed to slip in the direction opposite to the direction the slip gear is rotated with a force transmitted between the drive means and the first or second component, when the force becomes equal to or greater than a predetermined value.

In the joint device having this structure, for use in robot apparatuses, the slip gear slips in the direction opposite to the direction the slip gear is rotated with a force transmitted between the drive means and the first or second component, when the force becomes equal to or greater than a predetermined value.

A walking device for use in a robot apparatus, according to the present invention has leg sections, each designed to be driven by a drive force transmitted from drive means through a column of gears. The walking device comprises: a slip gear arranged in the column of gears and designed to slip in the direction opposite to the direction the slip gear is rotated with a force transmitted between the drive means and one leg section, when the force becomes equal to or greater than a predetermined value.

In the walking device of this structure, the slip gear slips in the direction opposite to the direction the slip gear is rotated with a force transmitted between the drive means and one leg section, when it receives a force that is equal to or greater than a predetermined value. When the clip gear slips so, the transmission of the force between the drive means and the leg section is interrupted.

An arm device for use in a robot apparatus, according to the invention, has arm sections, each designed to be driven by a drive force transmitted from drive means through a column of gears. The arm device comprises: a slip gear arranged in the column of gears and designed to slip in the direction opposite to the direction the slip gear is rotated with a force transmitted between the drive means and one arm section, when the force becomes equal to or greater than a predetermined value.

In the arm device having this structure, the slip gear slips in the direction opposite to the direction the slip gear is rotated with a force transmitted between the drive means and one arm section, when the slip gear receives a force that is equal to or greater than a predetermined value. When the clip gear slips in this manner, the transmission of the force between the drive means and the arm section is interrupted.

A walking robot apparatus according to this invention has a plurality of leg sections, each designed to be driven by a drive force transmitted from drive means through a column of gears. The walking robot apparatus comprises: a slip gear arranged in the column of gears and designed to slip in the direction opposite to the direction the slip gear is rotated with a force transmitted between the drive means and one leg section, when the force becomes equal to or greater than a predetermined value.

In the walking robot apparatus having this structure, the slip gear slips in the direction opposite to the direction the slip gear is rotated with a force transmitted between the drive means and one leg section, when the slip gear receives a force that is equal to or greater than a predetermined value. When the clip gear slips in this way, the transmission of the force between the drive means and the leg section is interrupted.

A drive-force transmitting device according to the present invention comprises a slip gear which slips in the direction opposite to the direction the slip gear is rotated with a force transmitted between the drive means and a component driven by the drive means, when the force becomes equal to or greater than a predetermined value. The slip gear is arranged at a position where the slip gear does not directly mesh with an input-end gear that receives a drive force from the drive means or with an output-end gear that transmits the drive force to the component.

In the drive-force transmitting device thus constructed, the slip gear slips in the direction opposite to the direction the slip gear is rotated with the force when the force becomes equal to or greater than a predetermined value. When the slip gear slips so, the transmission of the force between the drive means and the leg section is interrupted.

DETAILED DESCRIPTION OF THE INVENTION

An embodiment of the present invention will be described in detail, with reference to the accompanying drawings. The embodiment of the invention is a walking robot apparatus with a plurality of leg sections that are driven by electric motors. The walking robot is used as, for example, an industrial robot, an amusement robot, or the like.

Figure 1:
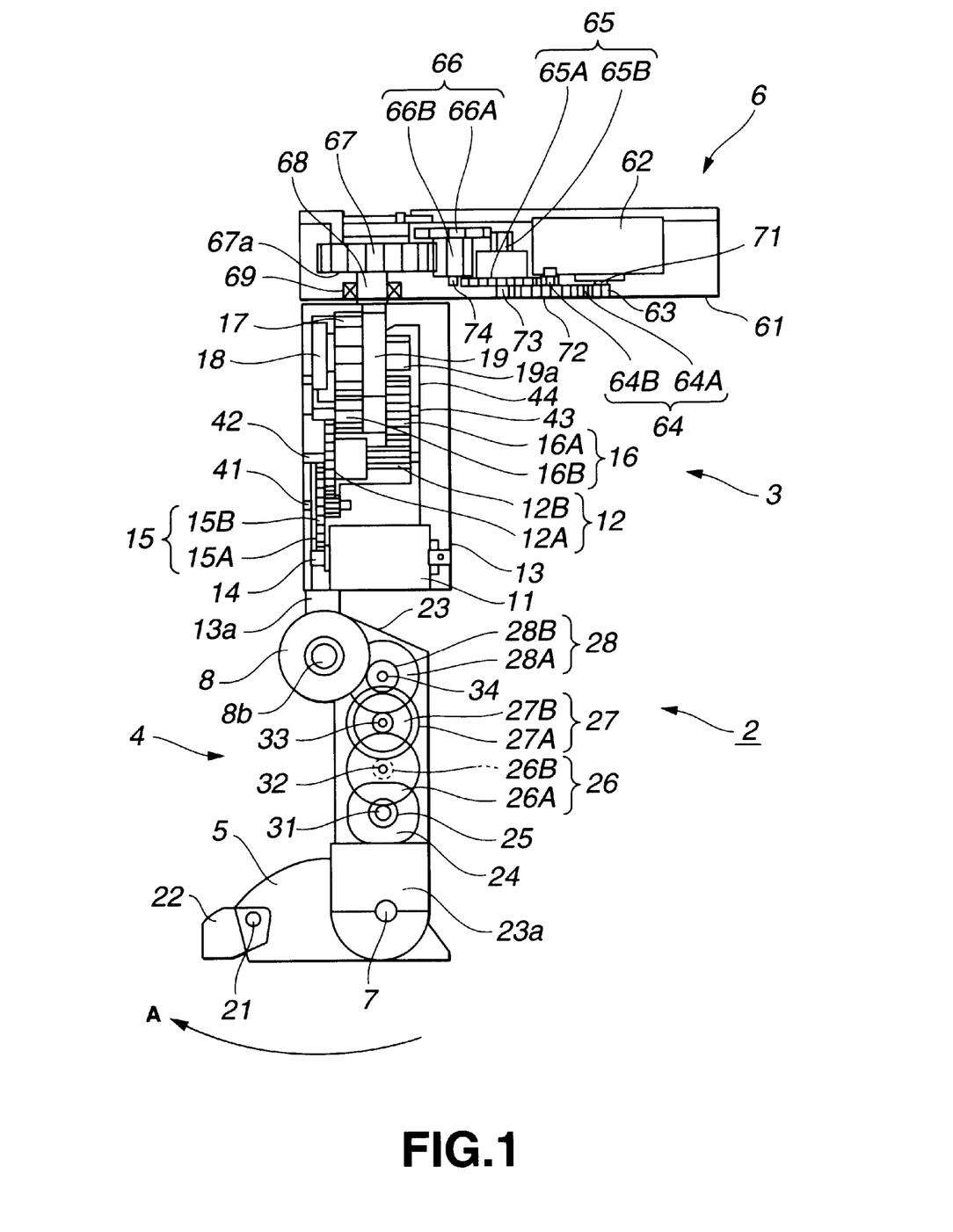
FIG. 1 is a sectional view showing one of the legs of a walking robot that is an embodiment of the present invention.
Figure 2:
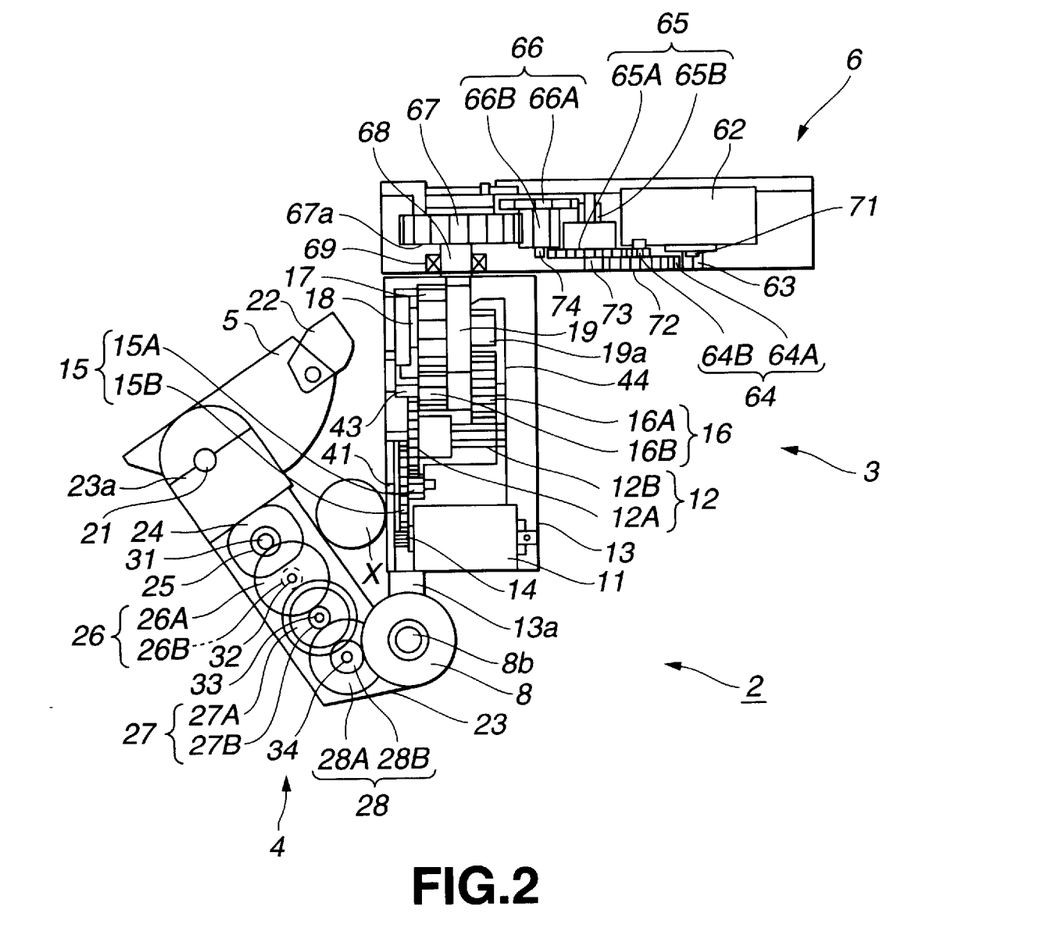
FIG. 2 is a sectional view of the leg, showing the shin rotated with respect to the thigh section.

FIGS. 1 and 2 show one of the leg sections of the walking robot. The leg section 2 comprises a thigh section 3, a shin section 4, and a foot section 5. The leg section 2 is secured to a leg-rotating section 6. The leg-rotating section 6 is incorporated in, for example, the trunk section of the robot and functions as, for example, the waist section.

As shown in FIG. 2, the foot section 5 of the leg section 2 can rotate around an axle 7 . The shin section 4 can rotate around the knee section 8. The thigh section 3 is supported by a leg-supporting section 68 and can rotate. That is, the axle 7, knee section 8 and leg-supporting section 68 constitute a joint section.

The thigh section 3 contains a column of gears, that is, an electric motor 11 and a thigh slip gear 12 are provided. The electric motor 11 functions as drive means. The thigh slip gear 12 slips in the direction opposite to the direction of normal rotation when the force transmitted between the electric motor 111 and the thigh section 3 becomes equal to or greater than a predetermined value. The shin section 4 has a shin slip gear 27, too, which works the same way. The structure of the thigh and shin slip gears 12 and 27 will be later described in detail.

The foot section 5, shin section 4, thigh section 3 that constitute the leg section 2 and the leg-rotating section 6 that rotates the leg section 2 will be described in detail.

The foot section 5 is secured to the distal end 23a of the housing 23 of the shin section 4 and is rotatably supported by, for example, an axle 21. A claw section 22 is attached to the distal end of the foot section 5 by an axle 21 and can rotate around the axle 21.

The shin section 4 comprises the housing 23, an electric motor 24, a motor-output shaft gear 25, and first to third shin gears 26, 27 and 28. The housing 23 is shaped like a rectangular box. The electric motor 24, motor-output shaft gear 25 and shin gears 26, 27 and 28 are provided in the housing 23.

The motor-output shaft gear 25 is secured on the output shaft 31 of the electric motor 24. The motor-output shaft gear 25 meshes with the first shin gear 26, which meshes with the second shin gear 27. The second shin gear 27 meshes with the third shin gear 28. The electric motor 24, motor-output shaft gear 25 and first to third shin gears 26, 27 and 28 are provided in, for example, a gear box. The electric motor 24 is, for example, a DC motor.

The first shin gear 26 is composed of a large-diameter gear 26A and a small-diameter gear 26B, which are formed integral, mounted on a gear axle 32 and coaxial with each other. The second shin gear 27 is composed of a large-diameter gear 27A and a small-diameter gear 27B, which are formed integral, mounted on a gear axle 33 and coaxial with each other. The third shin gear 28 is composed of a large-diameter gear 28A and a small-diameter gear 28B, which are formed integral, mounted on a gear axle 34 and coaxial with each other. The gear axles 32, 33 and 34 are rotatably provided in the above-mentioned gear box.

The motor-output shaft gear 25 described above meshes with the large-diameter gear 26A of the first shin gear 26. The small-diameter gear 26B formed integral with the large-diameter gear 26A meshes with the large-diameter gear 27A of the second shin gear 27. Further, the small-diameter gear 27B formed integral with the large-diameter gear 27A meshes with the large-diameter gear 28A of the third shin gear 28. Still further, the small-diameter gear 28B formed integral with the large-diameter gear 28A meshes with a gear 8a shown in FIG. 3, which is provided to rotate the shin section 4 with respect to the thigh section 3. In this column of gears, the motor-output shaft gear 25 functions as so-called input gear that receives the drive force of the electric motor 24, and the third shin gear 28 functions as so-called output gear that transmits drive force of the electric motor 24 to rotate the shin section 4.

Figure 3:
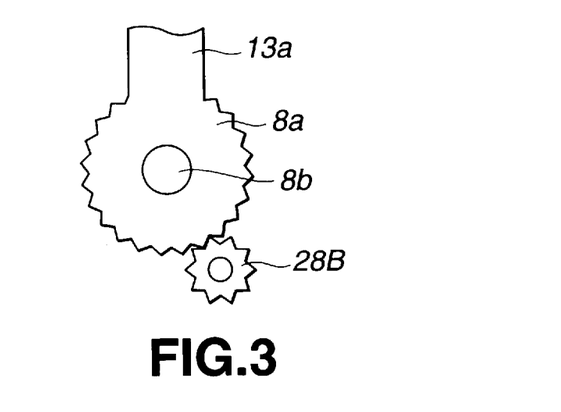
FIG. 3 is a diagram illustrating the gears of the knee section, designed to rotate the shin section.

The knee section 8, which receives the drive force from the third shin gear 28, i.e., the output gear, has the gear 8a provided on its back as is illustrated in FIG. 3. The gear 8a meshes with the small-diameter gear 28B of the third shin gear 28. The gear 8a is formed integral with the support section 13a of a housing 13 that is a part of the thigh section 3.

In the column of gears, constituting the shin section 4, the second shin gear 27 slips when it receives an external force exceeding a predetermined value. As the gear 27 slips, it does not transmit the external force to the any other gears. The shin section 4 may receive an external force or an impact. In this case, the third shin gear 28 transmits the external force to the other gears in the gear box. Nonetheless, the second shin gear 27 slips if the external force is equal to or greater than the predetermined value, not transmitting the external force to the first shin gear 26.

By virtue of the structure described above, the motor-output shaft gear 25 and the first and second shin gears 26 and 27 transmit the drive force of the electric motor 24 to the third shin gear 28. The drive force, thus transmitted, rotates the shin section 4 around the axle 8b of the knee section 8, in the direction of arrow A shown in FIG. 1, to, for example, the position illustrated in FIG. 2.

The slip mechanism of the second shin gear 27 prevents an external force, if any applied to the shin section 4, from being transmitted to the electric motor 24 that is a drive means.

Figure 4:
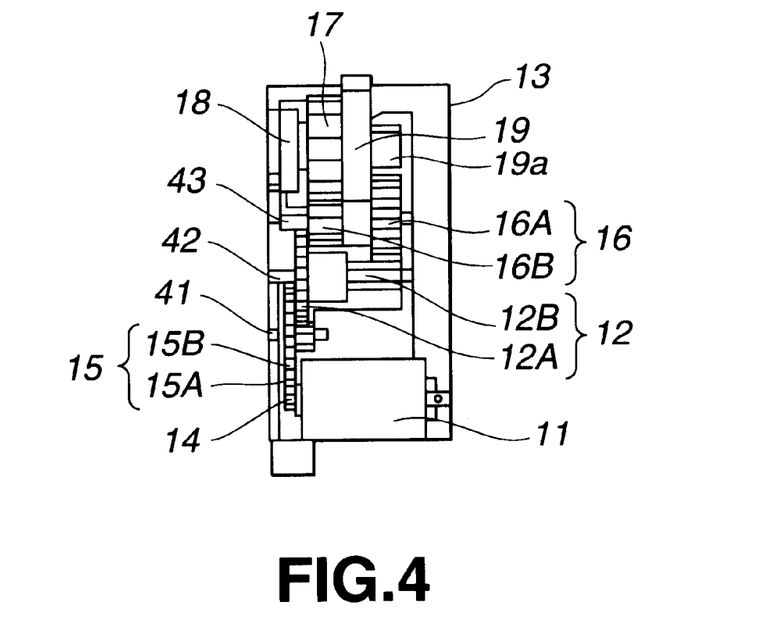
FIG. 4 is a sectional view of the drive mechanism for rotating the thigh section.

As shown in FIGS. 1, 2 and 4, the thigh section 3 comprises the housing 13, electric motor 11, motor-output shaft gear 14 and first to fourth thigh gears 15, 12, 16 and 17. The housing 13 is shaped like a rectangular box. The electric motor 11, motor-output shaft gear 14 and first to fourth thigh gears 15, 12, 16 and 17 are provided in the housing 13.

The motor-output shaft gear 14 is secured on the output shaft of the electric motor 11, which is not shown. The first thigh gear 15 meshes with the motor-output shaft gear 14, the second thigh gear 12 meshes with the first thigh gear 15, the third thigh gear 16 meshes with the second thigh gear 12, and the fourth thigh gear 17 meshes with the third thigh gear 16. The electric motor 11, motor-output shaft gear 14 and first to fourth thigh gears 15, 12, 16 and 17 are contained in, for example, a gear box 44. The electric motor 11 is, for example, a DC motor.

The first thigh gear 15 is composed of a large-diameter gear 14A and a small-diameter gear 14B, which are formed integral, mounted on a gear axle 41 and coaxial with each other. The second thigh gear 12 is composed of a large-diameter gear 12A and a small-diameter gear 12B, which are formed integral, mounted on a gear axle 42 and coaxial with each other. The third thigh gear 16 is composed of a large-diameter gear 16A and a small-diameter gear 16B, which are formed integral, mounted on a gear axle 43 and coaxial with each other. The fourth thigh gear 17 is mounted on a support member 19 that is fastened to the leg-supporting section 68. The gear axles 41, 42 and 43 are rotatably connected to, for example, the gear box 44.

The motor-output shaft gear 14 mentioned above meshes with the large-diameter gear 15A of the first thigh gear 15. The small-diameter gear 15B formed integral with the large-diameter gear 15A meshes with the large-diameter gear 12A of the second thigh gear 12. The small-diameter gear 12B formed integral with the large-diameter gear 12A meshes with the large-diameter gear 16A of the third thigh gear 16. Further, the small-diameter gear 16B formed integral with the large-diameter gear 16A meshes with the fourth thigh gear 17. In the column of gears, the motor-output shaft gear 14 functions as so-called input gear that receives the drive force of the electric motor 11, and the third thigh gear 16 functions as so-called output gear that transmits drive force of the electric motor 11 to rotate the thigh section 3.

In the column of gears constituting the thigh section 3, the second thigh gear 12 has a slipping function like the said second shin gear 27. That is, the second thigh gear 12 slips when it receives an external force exceeding a predetermined value. As the gear 12 slips, it does not transmit the external force to the any other gears. If the thigh shin section 3 receives an external force or an impact, the third thigh gear 16 transmits the external force to the column of gears provided in the gear box 44. Nonetheless, the second thigh 12 slips if the external force is equal to or greater than the predetermined value, not transmitting the external force to the first thigh gear 15.

Figure 5:
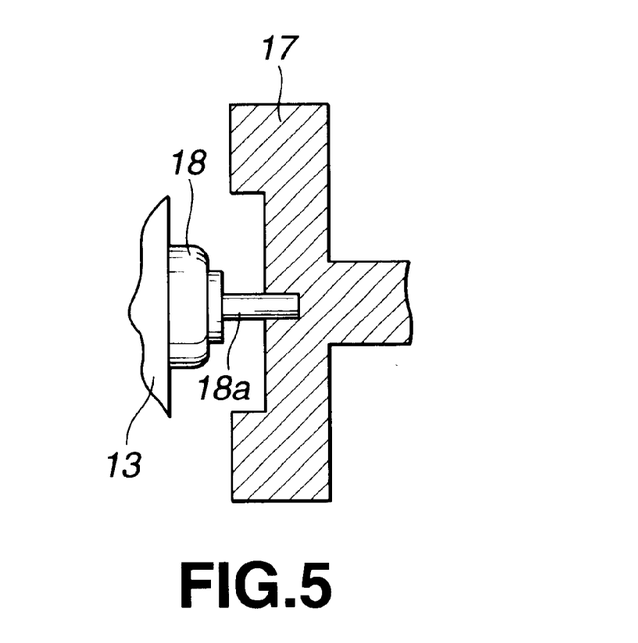
FIG. 5 is a sectional view showing the positional relation between the gear of the thigh section and the angle detector for detecting the angle of rotation of the gear of the thigh section.

The thigh section 3 has an angle detector for detecting the angle through which the thigh section 3 rotates. As shown in FIGS. 1 and 2, the angle detector 18 detects how much the fourth thigh gear 17 rotates, thus determining the angle through which the thigh section 3 rotates. The angle detector 18 is, for example, a potentiometer. As shown in FIG. 5, the detector 18 has a shaft 18a pushed into one side of the fourth thigh gear 18, in order to detect the rotation thereof. Thus, the detector 18 detects the angle of rotation of the thigh section 3.

In the thigh section 3 thus constructed, the drive force of the electric motor 11 is transmitted to the third thigh gear 16 that is in mesh with the fourth thigh gear 17, through the motor-output shaft gear 14, first thigh gear 15 and second thigh gear 12. The drive force thus transmitted rotates the thigh section 3 in a direction perpendicular to the drawing, while the thigh section 3 remains in, for example, the state illustrated in FIGS. 1 and 2.

When an external force of a specific magnitude acts on the thigh section 3, the second thigh gear 12 slips, preventing the external force from being transmitted to the electric motor 11 that functions as drive means.

As shown in FIGS. 1 and 2, the leg-rotating section 6 that rotates the leg section 2 comprises a housing 61, an electric motor 62, a motor-output shaft gear 63, and first to fourth support gears 64, 65, 66 and 67. The motor 62 and the gears 63 to 67 are provided in the housing 61.

The motor-output shaft gear 63 is secured on the output shaft 71 of the electric motor 62. The first support gear 64 meshes with the motor-output shaft gear 63. The second support gear 65 meshes with the first support gear 64. The third support gear 66 meshes with the second support gear 65. The fourth support gear 67 meshes with the third support gear 66. The electric motor 62 and the first to fourth support gears 64, 65, 66 and 67 are contained in a gear box. The electric motor 62 is, for example, a DC motor.

The first support gear 64 is composed of a large-diameter gear 64A and a small-diameter gear 64B, which are formed integral, mounted on a gear axle 72 and coaxial with each other. The second support gear 65 is composed of a large-diameter gear 65A and a small-diameter gear 65B, which are formed integral, mounted on a gear axle 73 and coaxial with each other. The third support gear 66 is composed of a large-diameter gear 66A and a small-diameter gear 66B, which are formed integral, mounted on a gear axle 74 and coaxial with each other. The fourth support gear 67 is secured to, and made integral with, the gear axle (not shown). The leg-supporting section 68 is formed integral with one side 67a of the fourth support gear 67. The leg section 3 is fastened to the leg-supporting section 68. The gear axles 72, 73 and 74 are rotatably connected to, for example, the above-mentioned gear box.

The motor-output shaft gear 63 meshes with the large-diameter gear 64A of the first support gear 64. The small-diameter gear 64B formed integral with the large-diameter gear 64A meshes with the large-diameter gear 65A of the second support gear 65. The small-diameter gear 65B formed integral with the large-diameter gear 65A meshes with the large-diameter gear 66A of the third shin gear 66.

Further, the small-diameter gear 66B formed integral with the large-diameter gear 66A meshes with the fourth support gear 67 that is formed integral with the leg-supporting section 68.

In the structure described above, , the drive force of the electric motor 62 is transmitted to the leg-supporting section 68, through the motor-output shaft gear 63 and the first to fourth support gears 64, 65, 66 and 67. The drive force thus transmitted rotates the thigh section 3 around the leg-supporting section 68.

As indicated above, the leg section 2 comprises the foot section 5, shin section 4 and thigh section 3. The thigh section 3 of the leg section 2, thus constructed, prevents an external force of a magnitude equal to or greater than a predetermined value from being transmitted to the electric motor 11, thanks to the slipping of the second thigh gear 12. One of the gears for transmitting a drive force is a slip gear of slip structure. This gear can prevent the electric motor 11 from stopping when the third thigh gear 16, i.e., the output gear, fails to rotate because, for example, the thigh section 2 is locked due to an external force or the like. Damage is thereby avoided even if the motor locking occurs because the electric motor 11 stops rotating.

As a result of the slip mechanism, the output gear can be rotated in the direction opposite to the direction in which the electric motor 11 rotates the thigh section 3, even while the thigh section 3 is rotating in that direction. For instance, an external force may be applied to the output gear toward the plane of the drawing (FIG. 1), to rotate the thigh section 3, while the electric motor 11 is rotating the thigh section 3 in the opposite direction, i.e., away from the plane of the drawing (FIG. 1).

A gear other than a gear that can be used to detect an angle may have slip structure. If so, it becomes possible to detect how much the thigh section 3 has rotated, by detecting the angle of rotation of the output shaft, no matter which state the electric motor 11 may take.

A similar function may be performed at any component arranged after the external output end. The number of components can thereby be reduced, making it smaller.

A gear slip mechanism is provided at the midpoint of the column of gears. Therefore, the slip mechanism works well with a small slip torque. This helps to render it smaller.

A large torque can be generated, without using components other than those required for the fundamental structure of the gearbox. In addition, a so-called shock-absorbing mechanism can be constituted, without using components other than those required for the fundamental structure of the gear box. Hence, it can be small and inexpensive.

The slip gear can be made by means of molding. No steps of assembling the slip gear are required. This serves to render it inexpensive. Since the slip gear is a molding, defective products can be decreased in number.

The advantages have been described, which are achieved by providing a gear having slip mechanism, such as a slip gear or the like, in the column of gears incorporated in the thigh section 3. Needless to say, the shin section 4 has similar advantages, because the second shin gear 27 has slip mechanism.

Figure 6:
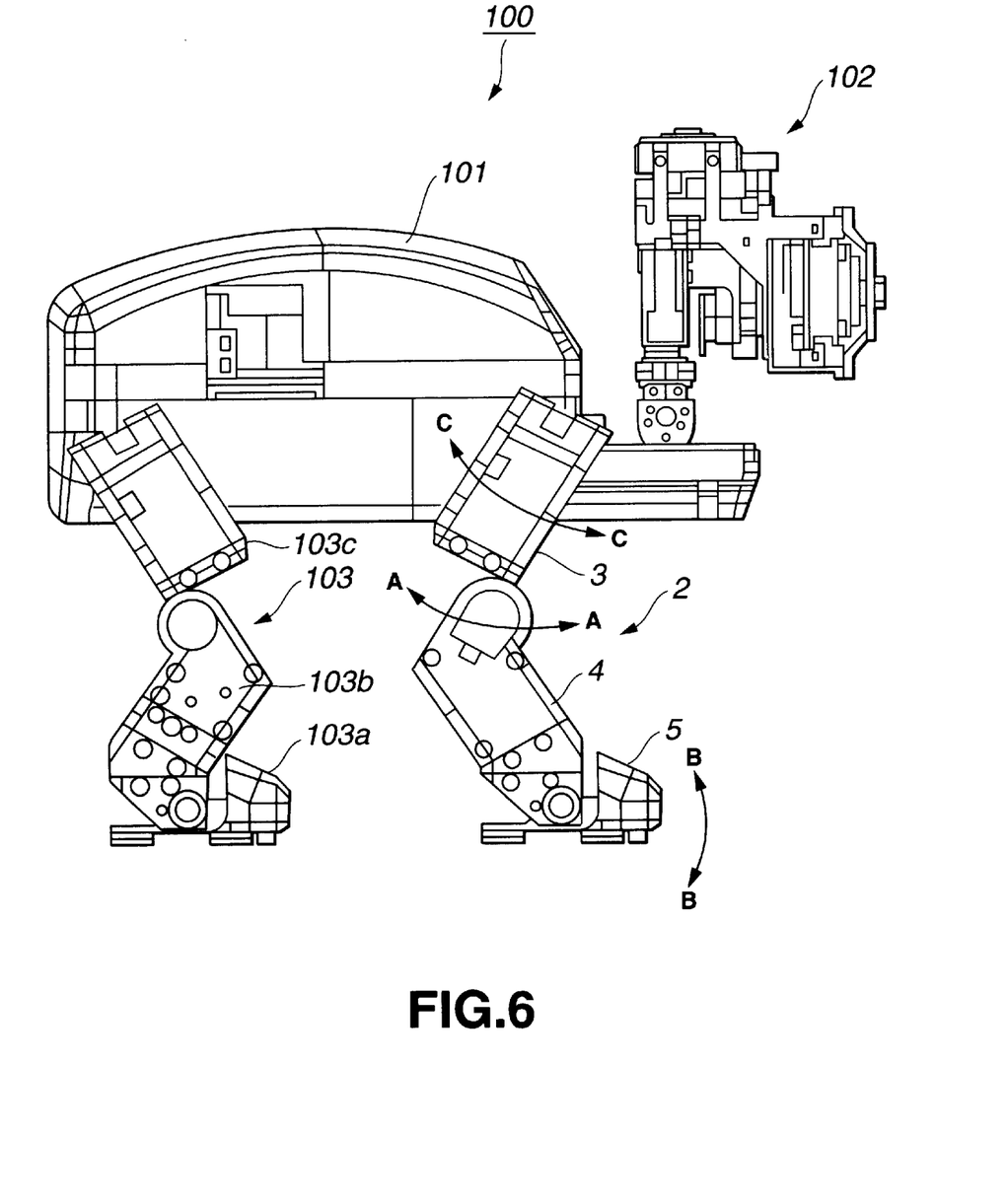
FIG. 6 is a side view of a four-legged walking robot that has thigh sections of the type mentioned above.

FIG. 6 shows a four-legged walking robot 100, which is a walking robot apparatus. The forelegs of the walking robot 100 are identical to the leg section 2 described above.

The walking robot 100 comprises a trunk section 101, a head section 102, leg sections 2, and hind-leg sections 103. The head section 102 is attached to the trunk section 101. The trunk section 101 incorporates, for example, a battery and a control section. The head section 102 incorporates a CCD (Charge Coupled Device) camera and the like. Like the leg 2, each hind-leg section 103 comprises a leg section 103a, a shin section 103b, and a thigh section 103c. The hind-leg section 103 is designed to rotate in the same way as the leg 2.

The walking robot 100 can stand and walk and can lay, spreading its legs, as the leg sections 2 and 103 are controlled. As for each leg section 2, the foot section 5 can rotate in the directions of arrows B—B as is illustrated in the figure, the shin section 4 can rotate in the directions of arrows A—A, and the thigh section 3 can rotate in the directions of arrows C—C and also in the direction perpendicular to the plane of the drawing. The other leg sections can move in the same manner. As the leg sections are controlled, the robot can walk, while standing.

Each leg section 2 of the walking robot 100 incorporates a gear having slip structure. Therefore, the same advantages as mentioned above, can be attained. That is, the gears are prevented from breaking even if they receive an external force or an impact. More specifically, the gears provided for driving the thigh section 3 are prevented from breaking due to the shock they may receive when the robot falls from a high level onto a lower level.

The user may have his or her finger caught between the thigh section 3 and the trunk section 101. Even in this case, the slip mechanism prevents the finger from being clamped at the root of the thigh section 3. Even if the user has a finger X caught between the root of the thigh section 3 and the trunk section 101 as shown in FIG. 2, the slip mechanism can prevent the finger from being pinched at the root of the thigh section 3.

In each hind-leg section 103, the column of gears of the shin section 103b and the column of gears of the thigh section 103c may each include a gear having slip structure. Thus, all leg sections can have the same advantages as described above. That is, the gears and drive means are prevented from being damaged due to, for example, an external impact.

In the present embodiment, both the shin section 4 and the thigh section 43 comprise a gear having slip structure each. Instead, only one of these sections, e.g., the thigh section 3, may comprise a gear having slip structure.

Figure 7:
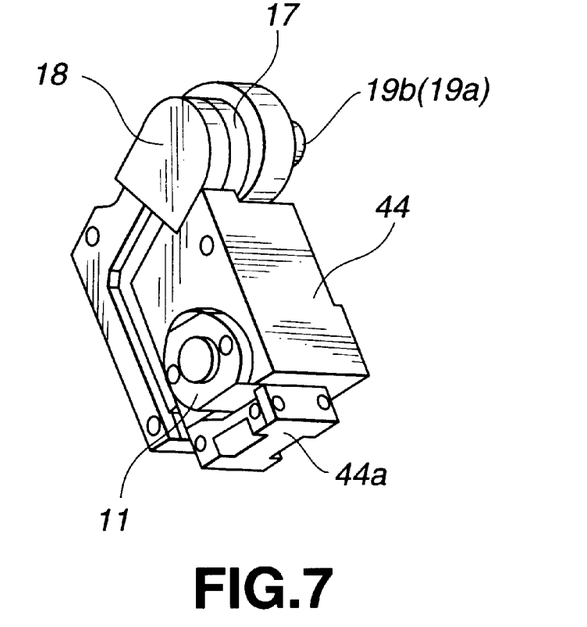
FIG. 7 is a perspective view of the gearbox incorporated in the thigh section.
Figure 8:
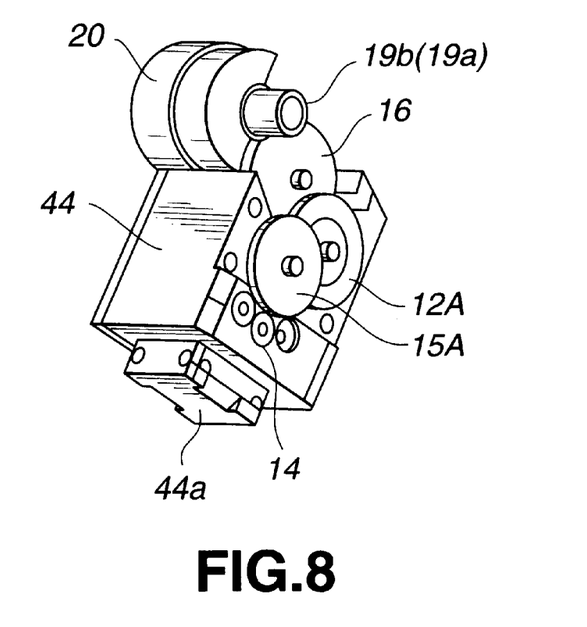
FIG. 8 is a perspective view of the gearbox incorporated in the thigh section, as viewed from another direction.

FIGS. 7 and 8 show the gearbox 44 provided in the housing of the each thigh section 3 of the walking robot 100. The gearbox 44 has the components of the thigh section 3.

The thigh section 3 differs in part from the thigh section 3 shown in FIGS. 1, 2 and 4 and described above, because it is used in the walking robot 100. For instance, one component extends in the opposite direction. That is, an axle 19b protrudes from the support member 19 in the opposite direction. (In FIGS. 1, 2 and 3, the axle 19a extends from the support member 19.)

As shown in FIGS. 7 and 8, a part of the electric motor 11, the motor-output shaft gear 14, the large-diameter gear 15A of the first thigh gear 15, the large-diameter gear 12A of the second thigh gear 12, and the fourth large-diameter gear 17 are provided on an outer side of the gear box 44. The axle 19b protruding from the support member 19 is not only attached to the gear box 44 but also supported by a bearing (not shown). On the lower side of the gear box 44, a coupling stay 44a is provided, connecting the thigh section to the shin section 8. It should be noted that the gear box 44 shown in FIG. 8 has a cover secured to one side.

The shin section 4 described above comprises a gear box similar in structure to the gear box 44 of the thigh section 3.

For example, the fourth thigh gear 17 shown in FIG. 8 corresponds to the gear 8a provided on the back of the shin section 8, and the coupling stay 44a connecting the thigh section to the shin section corresponds to the coupling stay for connecting the foot section 5 to the shin section.

Figure 9:
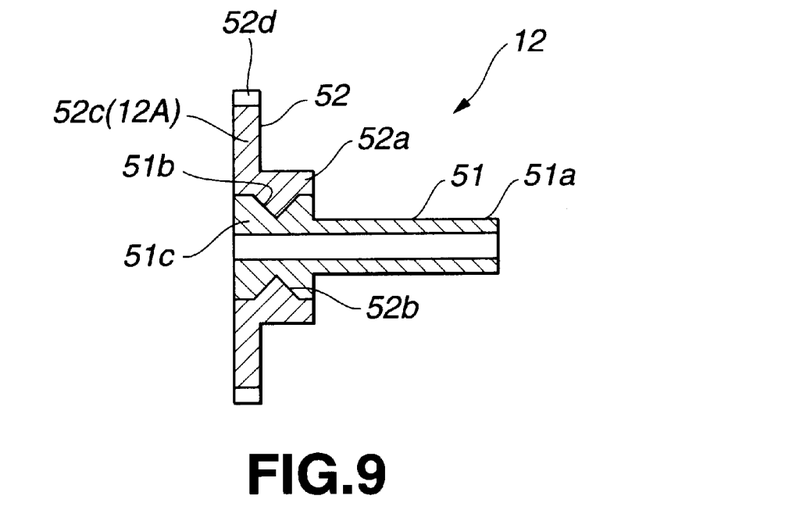
FIG. 9 is a sectional view of a specific example of a gear that has slip mechanism.

FIG. 9 is a sectional view of a specific example of a gear that has the slip mechanism described above. This gear is a second thigh gear 12, which will be described below.

The second thigh gear 12 has a slip structure and is a slip gear. That is, it slips in the direction opposite to the direction it is rotated with a force transmitted between the electric motor 1 and the thigh section 3, when that force is equal to or greater than a predetermined value.

The second thigh gear 12 is composed a first gear member 51 and a second gear member 52. The first gear member 51 is mounted on a gear axle 42 and has a substantially circular section taken along a line perpendicular to the axis of the gear axle 42. The second gear member 52 is set in sliding contact on the outer circumferential surface of the first gear member 51 and has gear teeth on its outer circumferential surface.

The first gear member 51 comprises an mounted section 51a and a engagement section 51c. The mounted section 51a is mounted on the gear axle 42. The engagement section 51c is coupled with the second gear member 52.

The mounted section 51a is shaped like a hollow cylinder. Its inner diameter is almost equal to the outer diameter of the gear axle 42. The engagement section 51c provided on the distal end portion of the mounted section 51a. A small-diameter gear 12B is mounted on the other portion of the mounted section 51a, on which the engagement section 51c is not provided. The small-diameter gear 12B meshes with the large-diameter gear 16A of the third thigh gear 16.

The outer circumferential surface 51b of the engagement section 51c is a frictional engagement surface, in which a V-groove is made. The second gear member 52 remains in engagement with the frictional engagement surface.

The second gear member 52 comprises an engagement section 52a and a gear-tooth section 52d. The engagement section 52a remains in engagement with the first gear member 51. The gear-tooth section 52d meshes with the small-diameter gear 15B of the first thigh gear 15. The engagement section 52a is shaped like a hollow cylinder. A annular projection having a V-shaped cross section is provided on the inner circumferential surface 52b of the engagement section 52a. The surface 52b functions as a frictional engagement surface. A disc-shaped gear section 52c, i.e., the large-diameter gear 12A, is provided on the distal end portion of the engagement section 52a. A gear section 52d is provided on the outer circumferential surface of the gear section 52c and meshes with the small-diameter gear 15B of the first thigh gear 15.

The second thigh gear 12 has been made by, for example, injection molding.

The frictional engagement surface 52b of the second thigh gear 12 having the structure described above does not slide on the frictional engagement surface 51b, by virtue of the frictional force generated between the surfaces 51b and 52b. Therefore, the first gear member 51 and the second gear member 52 rotate together, but the surface 52b slides on the surface 51b when the second gear member 52 receives a torque equal to or greater than a predetermined value with respect to the surface 51b. In other words, the second thigh gear 12 slips when a torque equal to or greater than the predetermined value is applied. The transmission of a force between the first thigh gear 15 and the third thigh gear 16 is thereby interrupted.

The gears having slip structure and used in the invention are not limited to the type illustrated in FIG. 9. Rather, gears of any other slip structure can be used in the invention.

In the embodiment described above, the present invention is applied to the leg sections of a robot apparatus. Nonetheless, the invention is not limited to such leg sections. In other words, this invention is not applied to only the joints of the leg sections. Rather, it can be applied to the joint section of any moving section.

To be more specific, the present invention can be applied to the joint device of a robot apparatus, which comprises a first component and a second component that can rotate around an axle. The joint device further comprises drive means and a column of gears. The column of gears includes a slip gear. When the force transmitted between the drive means and the first component or the second component becomes equal to or greater than a predetermined value, the slip gear slips in the direction opposite to the direction it is rotated with that force.

In the joint device of the robot apparatus, the slip gear slips in the direction opposite to the direction it is rotated with the force, when it receives a force equal to or greater than the predetermined value. This prevents the gears and the drive means from breaking.

Figure 10:
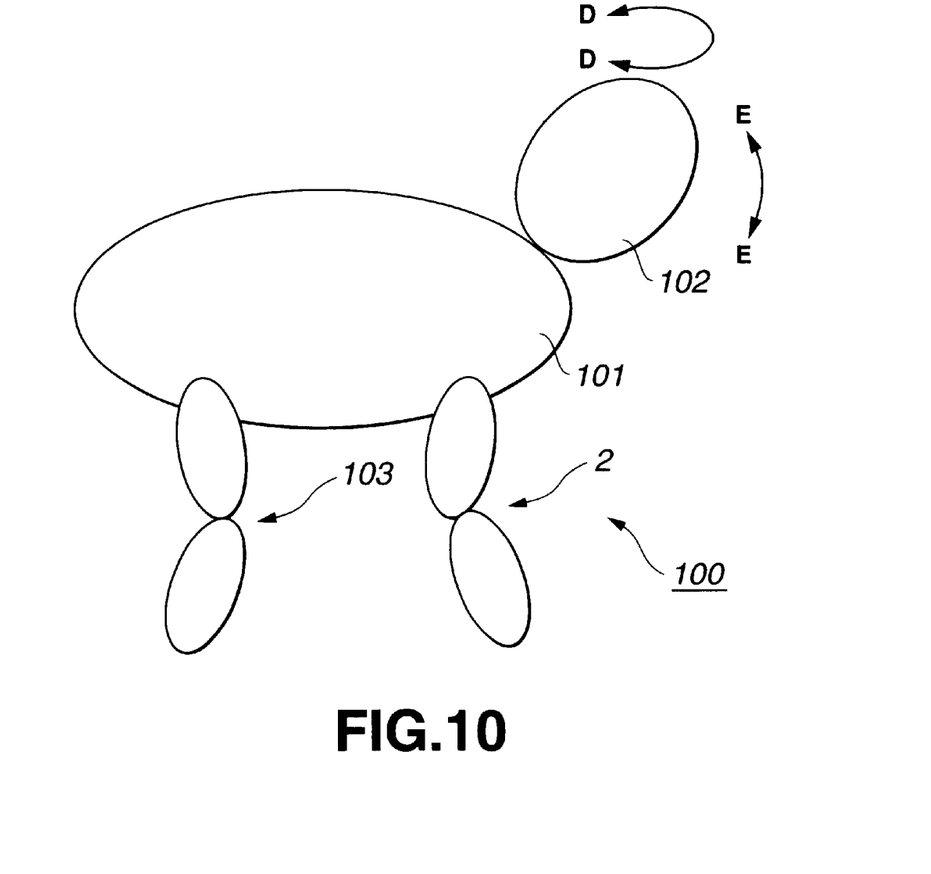
FIG. 10 is a diagram showing how the head section, i.e., the first component, is moved with respect to the trunk section, i.e., the second component.

More precisely, the robot apparatus 100 comprises a head section 101, i.e., the first component, and a trunk section 102, i.e., the second component, as is illustrated in FIG. 10. The head section 101 and the trunk section 102 can rotate. With respect to the trunk section 102, the head section 101 can rotate (in the directions of arrows D—D) and move up and down (in the directions of arrows E—E).

In this case, the slip gear can slip in the direction opposite to the direction it is rotated with the force transmitted between the drive means and the first component or second component, when it receives a force equal to or greater than a predetermined value.

Thus, the gears and the drive means, which are provided to drive the trunk section 101 and head section 102, can be prevented from breaking when the trunk section 101 or the head section 102 receives an external force.

Moreover, the present invention can be applied to the joints of the arm sections of a robot apparatus. In this instance, each arm device comprises drive means and a column of gears. The column of gears includes a slip gear. When the force transmitted between the drive means and the arm section becomes equal to or greater than a predetermined value, the slip gear slips in the direction opposite to the direction it is rotated with that force.

In the arm device of the robot apparatus, the slip gear slips in the direction opposite to the direction it is rotated with the force transmitted between the drive means and the arm section, when it receives a force equal to or greater than a predetermined value. The gears and the drive means can therefore be prevented from breaking when the arm section receives an external force.

The structure of the gear is not limited to the one described above. Needless to say, the gear can be re-designed in accordance with the manner in which the moving sections, such as the head section 102, should be driven. Industrial Applicability A joint device for use in a robot apparatus, according to the present invention comprises a first component, a second component, drive means, and a slip gear. The slip gear is included in a column of gears and slips in the direction opposite to the direction it is rotated with a force transmitted between the drive means and the first component or second component, when this force becomes equal to or greater than a predetermined value. Hence, the slip gear can slip in the opposite direction when it receives a force equal to or greater than the predetermined value.

Thus, the gears and the drive means can be prevented from breaking even if an external force is applied to the first component or the second component.

The slip gear may is provided at the midpoint in the column of gears. If so, a large torque can be generated at the output end, by applying a small slip torque. It is therefore possible to make the slip mechanism smaller than otherwise.

A walking device for use in a robot apparatus, according to this invention comprises a slip gear which is arranged in a column of gears. The slip gear slips in the direction opposite to the direction it is rotated with a force transmitted between the drive means and the leg section, when this force becomes equal to or greater than a predetermined value. The slip gear can slip in the opposite direction when it receives a force equal to or greater than the predetermined value.

Hence, the gears and the drive means can be prevented from breaking even if an external force is applied to the leg section.

Further, the slip gear may be provided at the midpoint in the column of gears. In this case, a large torque can be generated at the output end, by applying a small slip torque. The slip mechanism can therefore be smaller than otherwise.

An arm device for use in a robot apparatus, according to this invention comprises a slip gear which is arranged in a column of gears. The slip gear slips in the direction opposite to the direction it is rotated with a force transmitted between the drive means and the arm section, when this force becomes equal to or greater than a predetermined value. The slip gear can slip in the opposite direction when it receives a force equal to or greater than the predetermined value.

Hence, the gears and the drive means can be prevented from breaking even if an external force is applied to the arm section.

In addition, the slip gear may be provided at the midpoint in the column of gears. If so, a large torque can be generated at the output end, by applying a small slip torque. The slip mechanism can therefore be smaller than otherwise.

A walking robot according to this invention comprises a slip gear that is arranged in a column of gears. The slip gear slips in the direction opposite to the direction it is rotated with a force transmitted between the drive means and the leg section, when this force becomes equal to or greater than a predetermined value. The slip gear can slip in the opposite direction when it receives a force equal to or greater than the predetermined value.

Therefore, the gears and the drive means can be prevented from breaking even if an external force is applied to the leg section.

Moreover, the slip gear may be provided at the midpoint in the column of gears. Then, a large torque can be generated at the output end, by applying a small slip torque. The slip mechanism can therefore be smaller than otherwise.

A drive-force transmitting apparatus according to this invention comprises a slip gear that slips in the direction opposite to the direction it is rotated with a force transmitted between the drive means and the component driven by the drive means, when this force becomes equal to or greater than a predetermined value. The slip gear is arranged at a position where it does not directly mesh with the input-end gear that receives the drive force from the drive means or with the output-end gear that transmits the drive force to a leg section. Hence, the slip gear can slip in the opposite direction when it receives a force equal to or greater than the predetermined value.

Therefore, the gears and the drive means can be prevented from breaking even if an external force is applied to the leg section.

Further, the slip gear may be provided at the midpoint in the column of gears. Then, a large torque can be generated at the output end, by applying a small slip torque. This helps to render the slip mechanism smaller.

What is claimed is:

1. A joint device for use in a robot apparatus having a first component and a second component that are rotatable around an axle, said device comprising:

drive means for transmitting a force through a set of gears including the first component and the second component; and a slip gear arranged in the set of gears and having first and second members in which the first member has a V-shaped groove provided on its outer circumferential surface and said second member has a mating V-shaped tooth member provided on its inner circumferential surface whereby said slip gear is designed to slip in a direction opposite to a direction the slip gear is rotated with a force transmitted between the drive means and the first or second component, when the force becomes equal to or greater than a predetermined value.

2. The joint device for use in a robot apparatus according to claim 1, wherein the slip gear is arranged at a position where the slip gear does not directly mesh with an input end gear that receives a drive force from the drive means or with an output-end gear that transmits the drive force to the first or second component.

3. The joint device for use in a robot apparatus according to claim 1, wherein the drive means is provided in the first component or the second component.

4. The joint device for use in a robot apparatus according to claim 1, wherein the drive means and the set of gears are provided in a gear box.

5. A walking device for use in a robot apparatus having leg sections, each of said leg sections designed to be driven by a drive force transmitted from drive means through a set of gears, said device comprising:

a slip gear arranged in the set of gears and having first and second members in which the first member has a V-shaped groove provided on its outer circumferential surface and said second member has a mating V-shaped tooth member provided on its inner circumferential surface whereby said slip gear is designed to slip in a direction opposite to a direction the slip gear is rotated with a force transmitted between the drive means and one leg section, when the force becomes equal to or greater than a predetermined value.

6. The walking device for use in a robot apparatus according to claim 5, wherein the slip gear is arranged at a position where the slip gear does not directly mesh with an input-end gear that receives a drive force from the drive means or with an output-end gear that transmits the drive force to the leg section.

7. The walking device for use in a robot apparatus according to claim 5, wherein the drive means is provided in the leg section.

8. The walking device for use in a robot apparatus according to claim 5, wherein the drive means and the set of gears are provided in a gear box.

9. A walking robot apparatus having a plurality of leg sections, each of said leg sections designed to be driven by a drive force transmitted from drive means through a set of gears, said apparatus comprising:

a slip gear arranged in the set of gears and having first and second members in which the first member has a V-shaped groove provided on its outer circumferential surface and said second member has a mating V-shaped tooth member provided on its inner circumferential surface whereby said slip gear is designed to slip in a direction opposite to a direction the slip gear is rotated with a force transmitted between the drive means and one leg section, when the force becomes equal to or greater than a predetermined value.

10. The walking robot apparatus according to claim 9, wherein the slip gear is arranged at a position where the slip gear does not directly mesh with an input-end gear that receives a drive force from the drive means or with an output-end gear that transmits the drive force to the arm section.

11. The walking robot apparatus according to claim 9, wherein the drive means is provided in the leg section.

12. The walking robot apparatus according to claim 9, wherein it is shaped like a four-legged animal.

13. The walking robot apparatus according to claim 9, wherein the drive means and the set of gears are provided in a gear box.

* * * * *